United States Patent [19]
Nagel et al.

[11] Patent Number: 5,640,709
[45] Date of Patent: Jun. 17, 1997

[54] METHOD AND APPARATUS FOR PRODUCING A PRODUCT IN A REGENERATOR FURNACE FROM IMPURE WASTE CONTAINING A NON-GASIFIABLE IMPURITY

[75] Inventors: Christopher J. Nagel; William M. Haney, III, both of Wayland; Ian C. Yates, Boston, all of Mass.

[73] Assignee: Molten Metal Technology, Inc., Waltham, Mass.

[21] Appl. No.: 437,845

[22] Filed: May 9, 1995

Related U.S. Application Data

[62] Division of Ser. No. 41,772, Apr. 2, 1993.

[51] Int. Cl.$^6$ ................................. C01B 31/20
[52] U.S. Cl. ............... 588/201; 588/218; 588/240; 588/248; 423/522; 423/258
[58] Field of Search ................. 588/201, 218, 588/240, 242, 248; 423/522, 258

[56] References Cited

U.S. PATENT DOCUMENTS

| | | | |
|---|---|---|---|
| 3,203,758 | 8/1965 | Wainer | 23/167 |
| 3,527,178 | 9/1970 | Southwick | 110/8 |
| 3,616,767 | 11/1971 | Southwick | 110/8 E |
| 3,616,768 | 11/1971 | Southwick | 110/8 E |
| 3,648,629 | 3/1972 | Southwick | 110/8 R |
| 3,744,438 | 7/1973 | Southwick | 110/8 E |
| 3,845,190 | 10/1974 | Yosim et al. | 588/205 |
| 3,933,989 | 1/1976 | Itoh et al. | 423/481 |
| 3,969,490 | 7/1976 | de Beuckelaer et al. | 423/481 |
| 4,100,107 | 7/1978 | Wolk et al. | 252/443 |
| 4,269,817 | 5/1981 | Rohrmann | 423/502 |
| 4,399,108 | 8/1983 | Krikorian et al. | 423/5 |
| 4,447,262 | 5/1984 | Gay et al. | |
| 4,574,714 | 3/1986 | Bach et al. | 110/346 |
| 4,602,574 | 7/1986 | Bach et al. | 110/346 |
| 4,666,696 | 5/1987 | Shultz | 423/659 |
| 4,957,551 | 9/1990 | Aune | 75/657 |
| 5,177,304 | 1/1993 | Nagel | 588/201 |

FOREIGN PATENT DOCUMENTS 945824 4/1974 Canada ................. 110/10

*Primary Examiner*—Ngoclan Mai
*Attorney, Agent, or Firm*—Hamilton, Brook, Smith & Reynolds, P.C.

[57] ABSTRACT

An apparatus and method for producing a product, such as hydrogen halide gas or sulfuric acid, in a regenerator furnace subsystem from a waste containing a non-gasifiable impurity. The method of the invention includes directing a waste, containing a non-gasifiable impurity into a reaction zone, containing a molten metal bath, in a reactor maintained under conditions sufficient to dissociate the waste and to form a gasified feed component and a non-gasifiable impurity. The gasified feed component is then directed from the reactor to a regenerator furnace subsystem, maintained under conditions sufficient to convert the gasified feed component to the desired product.

The apparatus of the invention includes a reactor having a waste inlet and a gaseous effluent, a reaction zone containing a molten-metal bath for dissociating the waste, containing a non-gasifiable impurity, and forming a gasified feed component, and a lance for injecting the waste into the reaction zone. The apparatus also includes a regenerator furnace subsystem, for converting the gasified feed component to the desired product, and a means for directing the gasified feed component from the reactor into the regenerator furnace subsystem.

18 Claims, 1 Drawing Sheet

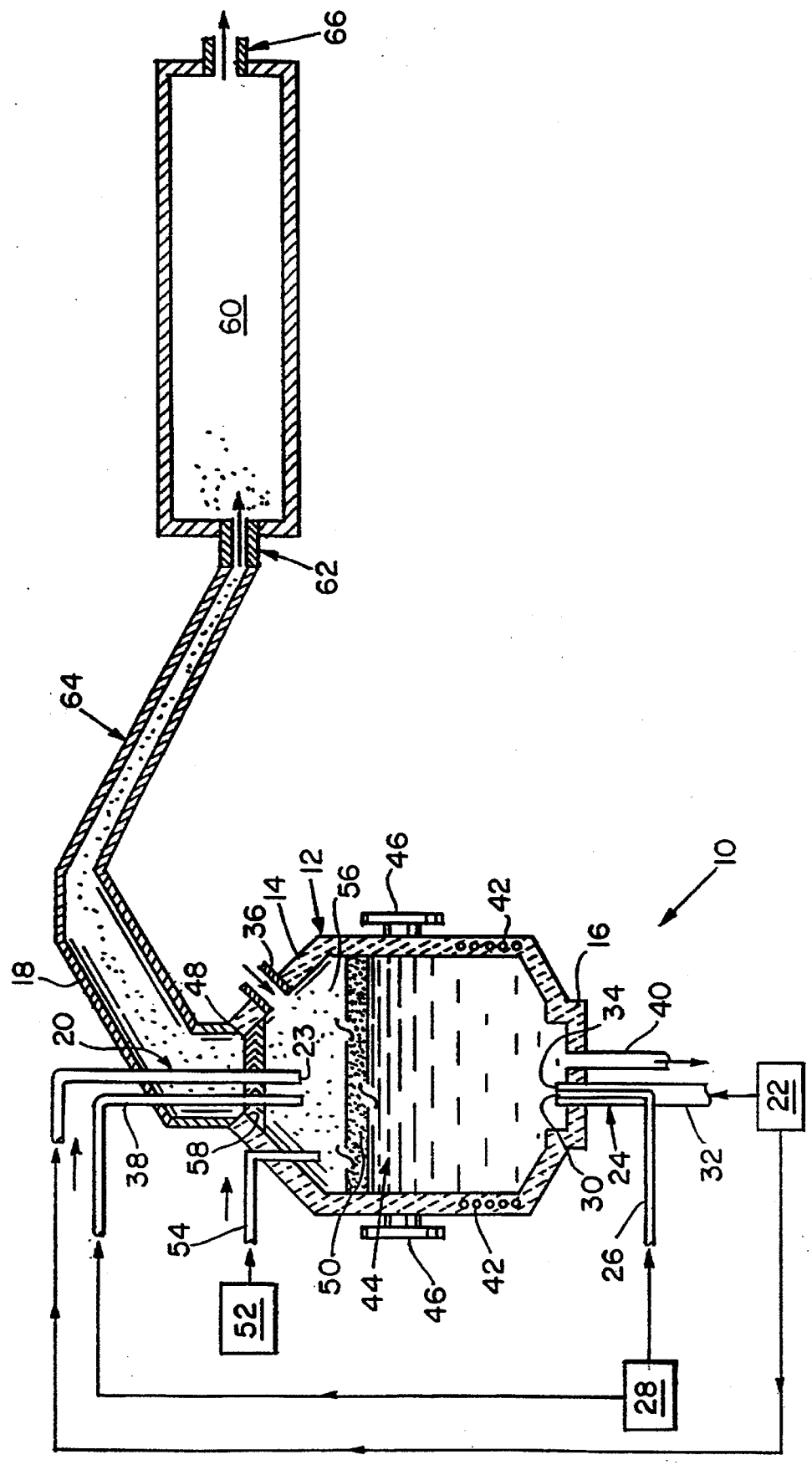

METHOD AND APPARATUS FOR PRODUCING A PRODUCT IN A REGENERATOR FURNACE FROM IMPURE WASTE CONTAINING A NON-GASIFIABLE IMPURITY

RELATED APPLICATION

This application is a division of co-pending application Ser. No. 08/041,772 filed Apr. 2, 1993 still which is incorporated herein by reference in its entirety.

BACKGROUND OF THE INVENTION

Many types of hazardous wastes, such as toxic or radioactive wastes, are produced every year. Many of these wastes include components which could be employed as feed to a regenerator furnace for forming useful chemical products. Such wastes include organic, inorganic, organometallic and radioactive materials. Examples of wastes containing potential feed components for a regenerator furnace include coke wastes, petroleum residuals, inner tubes, tires, polyvinyl chlorides, chlorobenzenes, polychlorinated biphenyls, teflon, pesticides, spent sulfuric acid, and uranium hexafluoride.

Currently, many of these wastes are disposed of in landfills or by incineration. However, disposal of wastes in landfills and by incineration has become an increasingly difficult problem because of diminishing availability of disposal space, strengthened governmental regulations, and the growing public awareness of the impact of hazardous substance contamination upon the environment. Release of hazardous wastes to the environment can contaminate air and water supplies thereby diminishing the quality of life in the affected populations.

Furthermore, disposal of these wastes without separating out valuable components or producing valuable products constitutes an economic loss of valuable chemical constituents. Thus, some of these wastes have been converted in chemical process furnaces to generate useful products, such as sulfuric acid, hydrochloric acid and hydrofluoric acid. However, the types of wastes previously processed by the chemical process furnaces have been limited to gasifiable wastes containing little ash-forming or metallic species. Processing impure wastes, such as those containing non-gasifiable components, has typically resulted in the fouling and loss of efficiency of chemical process furnaces, necessitating furnace down-time for removal of impurities deposited in the furnace.

To minimize the environmental and economic effects associated with the disposal of wastes, and to overcome the inability of current chemical process furnaces to process wastes containing non-gasifiable impurities, methods must be developed to convert these wastes into benign substances and/or useful substances.

SUMMARY OF THE INVENTION

The present invention relates to a method and an apparatus for producing a product in a regenerator furnace subsystem from a waste containing a non-gasifiable impurity for the regenerator furnace subsystem.

The method of the invention involves introducing a waste, containing a non-gasifiable impurity, into a molten metal bath in a reactor maintained under conditions sufficient to dissociate the waste and to form a gasified feed component and a non-gasifiable impurity. The gasified feed component is then directed from the reactor to a regenerator furnace subsystem, which is maintained under conditions sufficient to convert the gasified feed component to a desired product.

The apparatus involves a reactor, suitable for containing a molten metal, having a waste inlet and a feed outlet. The apparatus also involves a molten-metal bath for dissociating a waste, containing a non-gasifiable impurity, and forming a gasified feed component, and means to direct said waste into or onto the reaction zone containing the molten metal bath. The apparatus further involves a regenerator furnace subsystem, for converting the gasified feed component to a desired product, and a means for directing the gasified feed component from the reactor into the regenerator furnace subsystem.

This invention has the advantage of generating a product in a regenerator furnace subsystem from a waste containing a non-gasifiable impurity for the regenerator furnace. This reduces regenerator furnace fouling and also furnace downtime required for cleaning the furnace.

An additional advantage of this invention is that it provides a method for processing waste of diverse chemical nature and for recovering metals, and metal compounds, such as metal oxides, metal phosphates and metal sulfides, from waste containing a potential feed for a regenerator furnace wherein the metal or metal compound would be a regenerator furnace impurity.

BRIEF DESCRIPTION OF THE DRAWING

FIGURE shows 2 cut-away side elevational illustration of an apparatus suitable for producing a product in a regenerator furnace from a waste, containing a non-gasifiable impurity for the regenerator furnace.

DETAILED DESCRIPTION OF THE INVENTION

The features and other details of the method and apparatus of the invention will now be more particularly described with reference to the accompanying drawing and pointed out in the claims. It will be understood that the particular embodiments of the invention are shown by way of illustration and not as limitations of the invention. The principle features of this invention can be employed in various embodiments without departing from the scope of the present invention.

The method of this invention employs a method for destroying waste by dissociating the waste to its atomic constituents in a molten metal bath and for reforming these atomic constituents to form various products, such as the Bach/Nagel method disclosed in U.S. Pat. Nos. 4,574,714 and 4,602,574. The teachings of U.S. Pat. Nos. 4,574,714 and 4,607,574 are incorporated herein by reference.

One embodiment of the present invention is illustrated in the Figure. Apparatus 10 includes reactor 12. Examples of suitable reactors, fitted with appropriate injection means include "T"-shaped reactors, top and bottom-blown basic oxygen process reactors (K-BOP and Q-BOP, respectively), argon-oxygen decarbonization furnaces, electric arc furnaces, which have been fitted with a suitable means for charging or injection through the top, bottom or sides of the reactor, such as is known in conventional steelmaking practices. Reactor 12 includes upper portion 14 and lower portion 16. Gaseous effluent outlet 18, which extends from upper portion 14, is suitable for conducting a gasified feed component out of reactor 12.

Suitable introduction means, such as lance 20, which can be consumable, is disposed at upper portion 14 of reactor 12.

Lance 20 provides fluid communication between waste source 22 and upper portion 14 of reactor 12 through waste inlet 23. Waste inlet 23 is disposed in upper portion 14 of reactor 12 at the end of lance 20.

A second suitable introduction means includes tuyere 24, which is disposed at lower portion 16 of reactor 12. Tuyere 24 is dimensioned and configured for introducing a waste, which can also function as a shroud gas, and an agent into the reactor. Tuyere 24 includes agent inlet tube 26, which provides fluid communication between oxidant source 28 and lower portion 16 of reactor 12 through agent inlet 30. Agent inlet 30 is disposed in lower portion 16 of reactor 12 at the end of agent inlet tube 26. An agent as defined herein is a substance that reacts with the waste, for example, through oxidation, reduction, addition, substitution or exchange reactions. Oxidants suitable as agents include oxygen, air and iron oxide. Hydrogen is a reducing agent that is suitable as a agent. Waste inlet tube 32 of tuyere 24 provides fluid communication between waste source 22 and lower portion 16 of reactor 12. Waste inlet 34 is disposed in lower portion 16 of reactor 12 at the end of waste inlet tube 32.

A third suitable introduction means, such as bulk waste inlet 36, which extends from upper portion 14 of reactor 12, provides a means for directing bulky waste into reactor 12.

It is to be understood that suitable means for introducing waste into reactor 12 includes tuyeres, lances, inlets and other components capable of directing waste into the reactor. It is also to be understood that the means of introducing waste can direct waste into reactor 12 through the top, bottom or sides of reactor 12. Furthermore, it is to be understood that one or more means of introducing waste into reactor 12 can be disposed at the top, bottom and/or sides of reactor 12.

Also disposed at top portion 14 of reactor 12 is second agent inlet tube 38, which provides fluid communication between agent source 28 and upper portion 14 of reactor 12.

It is to be understood, that waste and the agent can be introduced into reactor 12 continuously, sequentially or intermittently. It is also to be understood that waste, agent and a separate shroud gas, when needed to shroud the inlet tube, can be injected into reactor 12 through other suitable configurations, such as a conjoined tuyere, a multiple concentric tuyere or separate waste and an agent tuyeres. Additionally, it is to be understood that means for injecting an agent include other suitable forms, for example, a lance disposed at lower portion 16 of reactor 12 or an inlet disposed at upper portion 14 of reactor 12. Furthermore, it is to be understood that more than one means of injecting an agent can be disposed at reactor 12.

In one embodiment, the waste and agent are introduced according to the method and system described in U.S. patent application Ser. No. 07/737,199, filed Jul. 29, 1991, which discloses the formation of oxides of dissolved atomic constituents in a molten metal bath. The teachings of U.S. patent application Ser. No. 07/737,199 are incorporated herein by reference.

Bottom tap 40 extends from lower portion 16 of reactor 12 and is suitable for removal of molten metal from reactor 12. Additional drains may be provided as a means of removing continuously, or discretely, additional phases. Material can also be removed by other methods, such as are known in the art.

Induction coil 42 is disposed at lower portion 16 of reactor 12 for heating molten metal bath 44 in reactor 12. It is to be understood that, alternatively, reactor 12 can be heated by other suitable means, such as by oxyfuel burners, electric arcs, etc.

Trunions 46 can be disposed at reactor 12 for manipulation of reactor 12. Seal 48 is disposed between reactor 12 and gaseous effluent outlet 18 and is suitable for allowing partial rotation of reactor 12 about trunions 46 without breaking seal 48.

Molten metal bath 44 is disposed within reactor 12. In one embodiment, molten metal bath 44 includes a metal having a free energy of oxidation, at the operating conditions of reactor 12 which is greater than that of the conversion of atomic carbon to carbon monoxide.

Examples of suitable metals in molten metal bath 44 include iron, chromium, manganese, copper, nickel, cobalt, etc. It is to be understood that molten metal bath 44 can include more than one metal. For example, molten metal bath 44 can include a solution of metals, such as iron with chromium, manganese, copper, nickel or cobalt. Also it is understood that molten metal bath 44 can include oxides of the molten metals. As disclosed in U.S. Pat. No. 5,177,304, the teachings of which are incorporated by reference, molten metal bath 44 can include more than one phase of molten metal.

Molten metal bath 44 is formed by partially filling reactor 12 with suitable metal. The metal is then heated to a suitable temperature by activating induction coil 42 or by other means, not shown. Where two immiscible metals are introduced into the reactor, the metals separate during melting and heating to form two distinct molten phases. In one embodiment, the viscosity of molten metal bath 44 is no greater than about 10 centipoise at the operating conditions of apparatus 10.

Suitable operating conditions of reactor 12 include a temperature of molten metal bath 44 which is sufficient to dissociate waste, containing a non-gasifiable impurity, to form components contained in a gaseous phase and in a molten metal and/or a vitreous phase. The gaseous phase components can include a gasified feed component, which may include sulfur, chlorine or fluorine atoms, and additional gaseous components such as hydrogen, carbon monoxide and small hydrocarbons, containing up to about six carbon atoms. The non-gasifiable product, which may include, for example, metal, aluminate or silicate, remains in the metal and/or vitreous phases.

Vitreous layer 50 is disposed in reactor 12 on molten metal bath 44. Vitreous layer 50 is substantially immiscible with molten metal bath 44. Vitreous layer 50 can have a lower thermal conductivity than that of molten metal bath 44. Radiant heat loss from molten metal bath 44 can thereby be reduced to significantly below the radiant heat loss from molten bath where no vitreous layer is present.

Examples of metal oxides typically found in vitreous layer 50 include titanium oxide (TiO), zirconium oxide ($ZrO_2$), aluminum oxide ($Al_2O_3$), magnesium oxide (MgO), calcium oxide (CaO), etc. Other examples of suitable components of vitreous layer 50 include halides, sulfides, phosphates, heavy metals, etc. It is to be understood that vitreous layer 50 can include more than one metal oxide. Vitreous layer 50 is fluid and monatomic species and other gases can pass across vitreous layer 50 from molten metal bath 44. When the chemical composition of the vitreous layer is chosen to be non-reactive. For example, a vitreous composition of 40 mole percent CaO, 10 mole percent $Al_2O_3$ and 50 mole percent $SiO_2$ allows chlorine and chlorinated species to pass through the vitreous layer, while a sulfur-bearing species can pass through a vitreous layer that is free of CaO.

Vitreous layer 50 is formed by directing suitable components, such as metals, metal oxides, halogens, sulfur, phosphorus, heavy metals, fluxes, sludges, etc., from flux source 52 through inlet tube 54 and onto and into molten metal bath 44 or from below the surface of molten metal bath 44. The components form oxides by exposure of the components to an oxidant directed into reactor 12 or from other stable compounds at system conditions by reacting with other less stable components, such as alkali metal or alkaline earth metal cations. Examples of such stable reacting products include calcium fluoride ($CaF_2$) and magnesium phosphate ($Mg_3(PO_4)_2$). A thin vitreous layer 50 facilitates the passage of carbon monoxide, gasified organics, monatomic species and other gaseous species across vitreous layer 50 to gas layer 56.

Gas layer 56 develops over vitreous layer 50. Gas layer 56 can comprise an agent directed into upper portion 14 of reactor 12 from agent source 28 through second inlet tube 38 when chemical processing within gas layer 56 so warrants.

In one embodiment, gas layer 56 extends from upper portion 14 of reactor 12 through gaseous effluent outlet 18. A reacton zone within reactor 12 includes molten metal bath 44, vitreous layer 50 and gas layer 56. Reactants, such as waste and an agent, can be introduced anywhere within the reaction zone. A substantial portion of the reaction within reactor 12 occurs within the reaction zone. Exothermic reaction of atomic constituents formed from the waste, such as formation of hydrogen chloride or carbon oxide gas can generate heat for chemical reaction of the waste components in the reaction zone.

In a preferred embodiment, gas layer 56 comprises gasified feed formed in the reaction zone and may include other gaseous components such as various highly caloric short-chain hydrocarbons, hydrogen and/or carbon oxide gas, etc.

Means for physically separating impurities, such as condensible gases or particulate material, from the gasified feed component, for example baffles 58, are disposed at gaseous effluent outlet 18. Baffles 58 are suitable to remove entrained physical impurities from a gasified component as the gasified component is directed through baffles 58. It is to be known that baffles 58 can be disposed upstream, downstream or in gaseous effluent outlet 18.

It is also to be known that separation means can include horizontal baffles, vertical baffles, centrifugal separators, chevron separators and any other means known in the art of separating a physical impurity from a gas stream.

Regenerator furnace subsystem 60 is provided to convert a gasified feed component of an impure waste, containing a non-gasifiable impurity for a regenerator furnace, into a purified product. Suitable regenerator furnace subsystems include, for example, regenerator systems known in the art for producing sulfuric acid, hydrogen chloride and hydrogen fluoride.

Furnace inlet 62, disposed at regenerator furnace subsystem 60, is suitable for directing a gasified component into regenerator furnace subsystem 60. Gas conduit 64, disposed between gaseous effluent outlet 18 of reactor 12 and furnace inlet 62 of regenerator furnace subsystem 60, provides fluid communication for a gasified feed component from gas layer 56 in upper portion 14 of reactor 12, through gaseous effluent outlet 18 and furnace inlet 62, to regenerator furnace subsystem 60.

Waste, as defined herein, is waste containing a specific chemical species, such as halogen or sulfur, wherein the specific chemical species can be separated from the waste and then processed in a regenerator furnace subsystem to form a useful product, for example, hydrogen halide gases or sulfuric acid, or the chemical species can be used to ameliorate the formation of a useful product, for example carbon, hydrogen or oxygen. A wide variety of waste material is suitable for treatment by this invention. This waste can include organic, organometallic and inorganic wastes. A suitable waste can contain chlorine, fluorine and/or sulfur. Examples of suitable wastes include chlorobenzenes, polyvinyl chlorides, polychlorinated biphenyls, polytetrafluoroethylane, spent pot linings, coke wastes, petroleum residuals, inner tubes, tires and spent sulfuric acid. Radioactive wastes, such as uranium hexafluoride, can also be processed.

In one embodiment waste containing a non-gasifiable impurity is directed into at least one portion of the reaction zone, specifically gas layer 56, vitreous layer 50 and/or molten metal bath 44 by injecting the waste into upper portion 14 of reactor 12. The waste is directed from waste source 22 through lance 20 into the reaction zone through upper portion 14 of reactor 12. Upon injection of the waste, the waste gasifies, and/or is dissociated and partially gasifies, to form at least one gasified feed component. The gasified feed component then migrates into, or remains in, gas layer 56. Concurrently, a non-gasifiable impurity is retained in vitreous layer 50 and/or molten metal bath 44. The non-gasifiable impurity can include metals, which could be retained in molten metal bath 44, light metals, or vitreous agents. A vitreous agent as defined herein is a condensible material that, under the operating conditions of reactor 12, is not in its elemental form. Such agents include, for example, $SiO_2$, $Ca_5$, $CaF_2$, etc. The non-gasifiable impurity can also contain metal salts, such as oxides, or ash-forming substances, such as silicate or aluminate, which could be retained in vitreous layer 50.

In an alternate embodiment, where the waste is bulky, the waste is directed through bulk waste inlet 36 into upper portion 14 into the reaction zone in reactor 12.

In the embodiment where the waste injected into reactor 12 through lance 20 contains sulfur and hydrocarbons, the waste partially dissociates to form a gaseous feed product containing organic sulfur-bearing species, such as methyl sulfide, inorganic sulfur-bearing species, such as hydrogen sulfide, and various short chain hydrocarbons. Elemental sulfur formed from decomposition remains in vitreous layer 50 and molten metal bath 44.

In another embodiment, concurrent with the introduction of waste into reactor 12, hydrogen in directed as an agent from agent source 28 through agent inlet tube 38 into upper portion 14 of reactor 12. The hydrogen then reacts with sulfur atoms in vitreous layer 50 and molten metal bath 44 to form hydrogen sulfide gas ($H_2S$) which then migrates through vitreous layer 50 into gas layer 56. Thus, gas layer 56 is comprised of hydrogen sulfide, short chain hydrocarbons and gaseous sulfur-bearing organic species. This composition of gas layer 56 can function as a component source and as a fuel supply, wherein the fuel is the organics, carbon oxide gas or the gasified component, for regenerator furnace subsystem 60. It is to be understood that the hydrogen injected as and an agent could also be injected through an alternate lance into lower portion 16 of molten metal bath 44.

In yet another embodiment, waste is directed from waste source 22 through waste inlet 34 into molten metal bath 44 in lower portion 16 of reactor 12. Upon introduction of the waste into molten metal bath 44, the waste dissociates to its atomic constituents to form a gasified feed component, or a gasifiable feed component, and a non-gasifiable impurity. Wherein the waste includes sulfur, the sulfur component can remain non-gasified during decomposition in molten metal bath 44 or in vitreous layer 50. Conversely, halogen atoms are gasified during decomposition. The halogen atoms then form halogenmolecules, or when hydrogen is present in reactor 12, hydrogen halide gases. The gasified halogen feed component then migrates through vitreous layer 50 into gas layer 56.

In an additional embodiment where the waste includes organic chemicals or species that can be oxidized to form a gaseous feed component, such as sulfur, an oxidant can also be directed as an agent from agent source 28 through agent inlet 30 into molten metal bath 44 in lower portion 16 of reactor 12. Upon introduction, the oxidant will react with the atomic constituents contained in molten metal bath 44, which are oxidizable, to form gasified oxides such as carbon monoxide, carbon dioxide or sulfur dioxide. These gasified oxides then migrate through vitreous layer 50 into gas layer 56. Furthermore, upon injecting an oxidant into reactor 12, oxidizable decomposition products contained in gas layer 56, such as monatomic hydrogen or diatomic hydrogen, will also react with the oxidant to form gaseous oxides, for example, water.

In an alternative embodiment, wherein the waste includes hydrogen and sulfur, separate streams of hydrogen and sulfur are formed by sequentially introducing the waste into the reaction zone and then directing the hydrogen gas formed out of reactor 12 through gaseous effluent outlet 18, prior to introducing the oxidant into molten metal bath 44 and/or vitreous layer 56. The waste and oxidant are introduced according to the method and system described in U.S. patent application Ser. No. 07/895,358, filed Jun. 8, 1992, which discloses the formation of separate streams of hydrogen and carbon oxide gases from the decomposition of organic waste in a molten metal bath. The teachings of U.S. patent application Ser. No. 07/895,358 are incorporated herein by reference.

The gasified component, specifically the gasified feed component and other gaseous species contained in gas layer 56, is then directed out of upper portion 14 of reactor 12 through baffles 58 and gaseous effluent outlet 18. Impurities, such as condensible gases and particulate material, entrained with the gasified component will then be trapped by baffles 58 and separated from the gasified component.

The gasified component, including the gasified feed component, is then directed from gaseous effluent outlet 18, through gas conduit 64 and furnace inlet 62, into regenerator furnace subsystem 60. The gasified feed component in regenerator furnace subsystem 60 is then exposed to conditions sufficient to produce a desired product. In one embodiment, regenerator furnace subsystem 60 produces a hydrogen halide gas, from a gaseous feed component containing a halogen, by means known in the hydrogen halide regeneration art. Suitable halogens include fluorine and chlorine. In another preferred embodiment, the hydrogen halide is hydrogen fluoride gas.

In a second embodiment, regenerator furnace subsystem 60 produces sulfuric acid from hydrogen sulfide gas or sulfur dioxide gas by means known in the sulfuric acid regeneration art. For example, hydrogen sulfide gas is oxidized to form sulfur dioxide and water. Sulfur dioxide is sequentially dried, to remove water, and then catalytically converted to form sulfur trioxide. The sulfur trioxide is then hydrated to form sulfuric acid.

Equivalents

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A method for producing a product in a regenerator furnace subsystem from a waste containing a non-gasifiable impurity for the regenerator furnace subsystem, comprising the steps of:
   a) introducing the waste, said waste including at least one sulfur compound suitable as a feed for a regenerator furnace, into a molten metal bath maintained under conditions sufficient to dissociate said waste and form a gasified feed component for the regenerator furnace subsystem, whereby said waste dissociates and forms the gasified feed component and a non-gasifiable impurity;
   b) directing said gasified feed component through a means for removing an impurity from said gasified feed component; and
   c) directing the gasified feed component into the regenerator furnace subsystem maintained under conditions sufficient to convert the gasified feed component into said product.

2. The method of claim 1 wherein said waste includes one or more halogen compounds suitable as a feed for a regenerator furnace.

3. The method of claim 2 wherein the halogen of said halogen compounds includes chlorine.

4. The method of claim 2 wherein the halogen of said halogen compounds includes fluorine.

5. The method of claim 1 further comprising the step of introducing an agent into said molten metal bath to establish conditions sufficient to form the gasified feed component.

6. The method of claim 1 wherein said product includes sulfuric acid.

7. The method of claim 1 wherein said agent includes hydrogen.

8. The method of claim 1 wherein said agent includes oxygen.

9. The method of claim 1 wherein said gasified feed component further includes a fuel supply for said regenerator furnace subsystem.

10. The method of claim 1 wherein the molten metal bath includes a vitreous layer, which is disposed at an upper portion of the molten metal bath, for removing an impurity from the gasified feed component.

11. The method of claim 10 wherein the vitreous layer includes 50 mole percent silicon dioxide, 40 mole percent calcium oxide and 10 mole percent aluminum oxide.

12. The method of claim 10 wherein the molten metal bath includes iron.

13. A method for producing sulfuric acid in a regenerator furnace subsystem from a sulfur-bearing waste containing a non-gasifiable impurity for the regenerator furnace subsystem, comprising the steps of:
   a) introducing said waste into a molten metal bath maintained under conditions sufficient to dissociate said waste and form a gasified sulfur-bearing feed component for the regenerator furnace subsystem, whereby said waste dissociates and forms said gasified feed component and a non-gasifiable impurity; and
   b) directing said gasified feed component into the regenerator furnace subsystem maintained under conditions sufficient to convert said gasified feed component into sulfuric acid.

14. A method for producing sulfuric acid in a regenerator furnace subsystem from a sulfur-bearing waste containing a non-gasifiable impurity for the regenerator furnace subsystem, comprising the steps of:
  a) introducing the waste into a reaction zone, containing a molten metal bath, wherein said reaction zone is maintained under conditions sufficient to dissociate said waste to form a sulfur component, a fuel component and the non-gasifiable impurity;
  b) directing hydrogen into said reaction zone;
  c) exposing said sulfur component and hydrogen in the reaction zone to conditions sufficient to form a hydrogen sulfide feed; and
  d) directing said hydrogen sulfide feed into the regenerator furnace subsystem maintained under conditions sufficient to convert said hydrogen sulfide feed into sulfuric acid.

15. The method of claim 1 wherein said gasified feed component is a fuel supply for said regenerator furnace subsystem.

16. A method for producing a product in a regenerator furnace subsystem from a waste containing a non-gasifiable impurity for the regenerator furnace subsystem, comprising the steps of:
  a) introducing the waste, said waste including at least one sulfur compound suitable as a feed for a regenerator furnace, into a molten metal bath that includes a vitreous layer, which is disposed at an upper portion of the molten metal bath, the molten metal bath being maintained under conditions sufficient to dissociate said waste and form a gasified feed component for the regenerator furnace subsystem, whereby said waste dissociates and forms the gasified feed component and a non-gasifiable impurity, and whereby the vitreous layer removes an impurity from the gasified feed component; and
  b) directing the gasified feed component into the regenerator furnace subsystem maintained under conditions sufficient to convert the gasified fed component into said product.

17. The method of claim 16 further comprising the step of directing said gasified feed component through a means for physically removing an impurity, prior to directing said gasified feed component into the regenerator furnace subsystem.

18. A method for producing a product in a regenerator furnace subsystem from a waste containing a non-gasifiable impurity for the regenerator furnace subsystem, comprising the steps of:
  a) introducing the waste, said waste including at least one uranium compound suitable as a feed for a regenerator furnace, into a molten metal bath maintained under conditions sufficient to dissociate said waste and form a gasified feed component for the regenerator furnace subsystem, whereby said waste dissociates and forms the gasified feed component and a non-gasifiable impurity;
  b) directing said gasified feed component through a means for removing an impurity from said gasified feed component; and
  c) directing the gasified feed component into the regenerator furnace subsystem maintained under conditions sufficient to convert the gasified feed component into said product.

* * * * *